(12) United States Patent
Knappert et al.

(10) Patent No.: US 6,959,867 B2
(45) Date of Patent: Nov. 1, 2005

(54) APPARATUS FOR AIMING A SCANNER

(75) Inventors: Michael L. Knappert, Brier, WA (US);
Bret J. Dodd, Sedro Woolley, WA (US)

(73) Assignee: Ryzex, Inc., Bellingham, WA (US)

( * ) Notice: Subject to any disclaimer, the term of this patent is extended or adjusted under 35 U.S.C. 154(b) by 0 days.

(21) Appl. No.: 10/879,642

(22) Filed: Jun. 29, 2004

(65) Prior Publication Data

US 2005/0035204 A1    Feb. 17, 2005

Related U.S. Application Data

(60) Provisional application No. 60/483,988, filed on Jun. 30, 2003.

(51) Int. Cl.[7] .............................................. G06K 7/10
(52) U.S. Cl. ............. 235/454; 235/462.01; 235/472.01
(58) Field of Search ........................... 235/462, 472.01; 42/132, 137, 141, 144

(56) References Cited

U.S. PATENT DOCUMENTS

| | | | | |
|---|---|---|---|---|
| 3,975,851 A | * | 8/1976 | Benford | 42/137 |
| 3,984,917 A | * | 10/1976 | Korzeniewski | 42/138 |
| 4,669,193 A | * | 6/1987 | Moore | 33/613 |
| 5,519,941 A | * | 5/1996 | Yusko | 42/133 |
| 5,801,371 A | * | 9/1998 | Kahn et al. | 235/472.01 |
| 6,684,551 B2 | * | 2/2004 | Howe | 42/132 |
| 6,711,846 B1 | * | 3/2004 | Nasef | 42/130 |

* cited by examiner

Primary Examiner—Daniel Stcyr
Assistant Examiner—Daniel A. Hess
(74) Attorney, Agent, or Firm—Blakely, Sokoloff, Taylor & Zafman LLP

(57) ABSTRACT

The application discloses embodiments of an apparatus comprising a base having a top, a bottom, a proximal side and a distal side, the bottom being attachable to a scanner, an adjustable proximal sight on or near the proximal side, the proximal sight including a sighting notch therein, and a distal sight on or near the distal side, the distal sight being substantially aligned with the proximal sight and including a mount attached to the base and a tubular sighting element attached to the mount. Other embodiments are disclosed and claimed.

31 Claims, 5 Drawing Sheets

APPARATUS FOR AIMING A SCANNER

CROSS-REFERENCE TO RELATED APPLICATIONS

This utility application claims priority under 35 U.S.C. § 119(e) to U.S. Provisional Patent Application Ser. No. 60/483,988, filed Jun. 30, 2003, and currently pending.

TECHNICAL FIELD

The present invention relates generally to scanners and in particular, but not exclusively, to an aiming device for bar code scanners.

BACKGROUND

Bar-coding has become a near-ubiquitous way of encoding and storing information and, consequently, bar-code scanners used to read and decode bar-coded information have become extremely common. Among the most common type of scanners are the hand-held variety: typically shaped like a gun, the scanner is held by a user, pointed at the bar code, and activated by means of a trigger to cause the scanner to scan a laser beam across the bar code being read. To obtain a proper scan of a bar code, a hand-held scanner must be pointed at a bar code so that the bar code is within the fields of view of the scanning laser and of the photodetectors in the scanner that pick up optical energy from the scanning laser's reflection off the bar code. To assist a user in pointing the hand-held bar code scanner the scanning beam is designed to be visible, so that when the scanner is pointed at a surface the user can see the beam's trajectory on the surface. Since the beam's trajectory is visible, the user then can move the scanner until the trajectory of the beam crosses the bar code, as which point the bar code is within the scanner's field of view and can be read.

Using the trajectory of the scanning laser to properly point the scanner works well, provided the user can see the trajectory. For scanners used in locations where the ambient light is dim in comparison to the beam (e.g., most indoor applications) and where the distance from scanner to bar code is small, the trajectory is usually clearly visible. When used where the ambient light is very bright (e.g., most outdoor applications in direct sunlight) and/or where the distance between scanner and bar code is large, the beam's trajectory may not be visible to the user, and therefore cannot assist the user in pointing the scanner such that the laser's trajectory crosses the bar code.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus method for accurately aiming a scanner are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
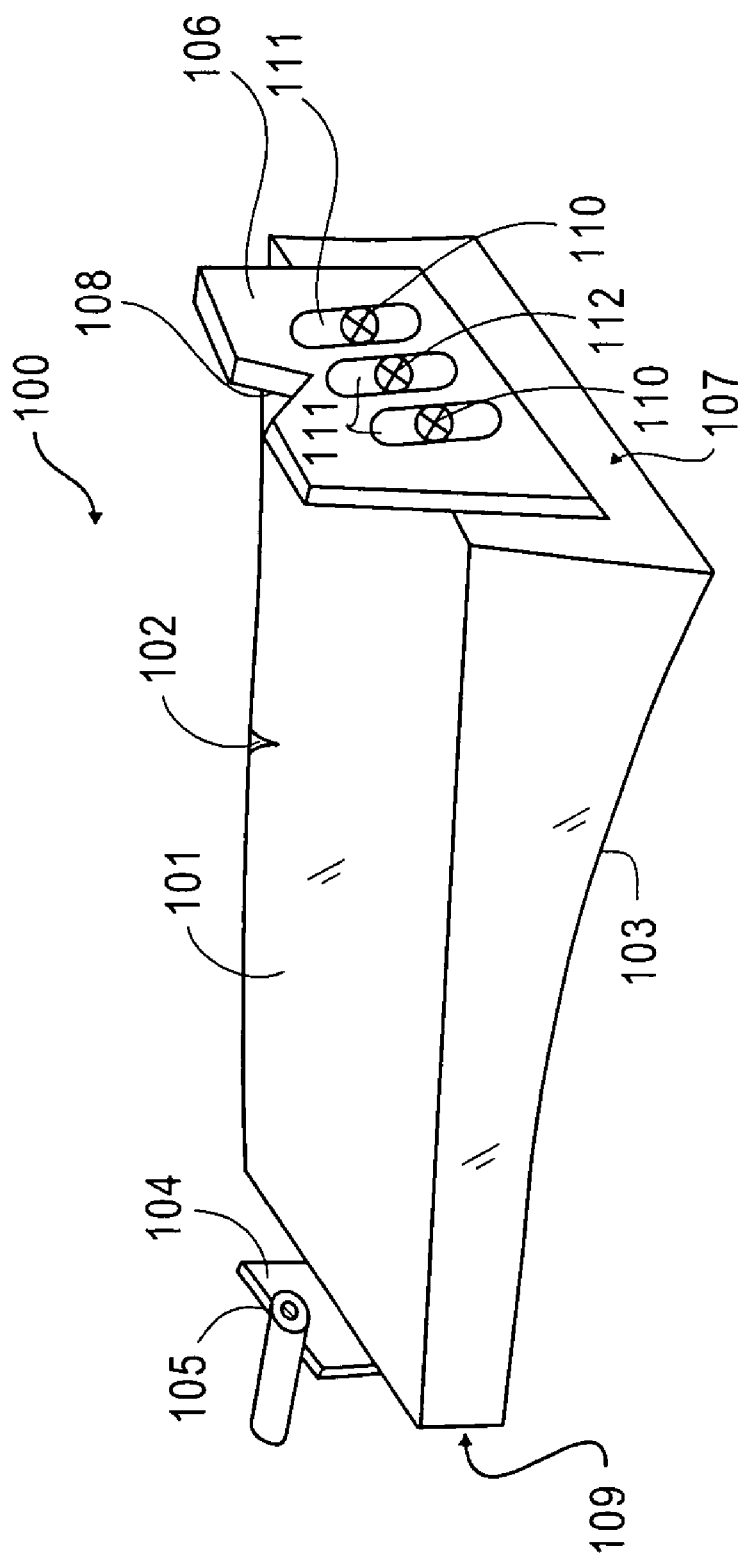
FIG. 1 is a perspective drawing of an embodiment of the invention.

FIG. 1 illustrates an embodiment of an aiming device 100 for use with a scanner. The aiming device 100 comprises a base 102 having a top surface 101, a bottom surface 103, a proximal end 107 and a distal end 109. A proximal sight 106 is attached to or integrated in the proximal end 107, while a distal sight 104 is attached to or integrated in the distal end 109 such that it substantially aligns with the proximal sight 106.

In an embodiment, the base 102 is shaped so that the top surface 101 is substantially flat, while the bottom surface 103 is shaped to conform to the surface of the scanner to which the aiming device 100 will be attached. Although in the embodiment shown the base tapers between the proximal end and the distal end, in other embodiments there can be more taper, less taper, or no taper at all. The width of the base will usually be less than or equal to the width of the scanner to which it will be attached. The base 102 can be made of any suitable material; in one embodiment, the base 102 is machined from a solid block of a metal such a aluminum, while in other embodiments the base can be molded plastic, or can be machined from a solid block of a plastic, polymer or other suitable material.

In one embodiment, the proximal sight 106 comprises a tab having a V-shaped notch 108 and three slots 111 therein. The proximal sight 106 is slidably attached to the proximal end 107 of the base by inserting fasteners such as screws 110 into at least two of the three slots 111; the remaining slot can be left unused or can be used, for example, to accommodate an alignment pin 112. The proximal sight is positioned on the proximal end 107 so that it projects above the top surface 101 of the base. The distance by which the proximal sight 106 projects above the top surface 101, or more specifically the distance by which the bottom of the V-shaped notch 108 projects above the top surface, can be adjusted by loosening the screws 110, moving the sight 106 to the desired position, and tightening the screws. The proximal sight 106 can be made of any material that is compatible with the material used for the base 102; this may or may not be the same material as the base 102.

In one embodiment, the distal sight 104 comprises a tab having therein a sighting element 105. The distal sight is fixed to the distal end 109 of the base and is substantially laterally aligned with the proximal sight 106; both proximal and distal sights may, for example, be positioned along a centerline of the base 102. The distal sight can be attached to the distal end 109 by any means, including fasteners, adhesives, etc. The sighting element 105 comprises a generally cylindrical tube, although in an alternative embodiment the sighting element can include a flared end on the side closest to the proximal sight 106 (see FIG. 4, reference numeral 405). In one embodiment, the sighting element 105 is made of an injection molded optical-quality resin with a tint or color added to the optical resin so that the sighting element 105 will stand out from the background, and so that it will provide substantial contrast with the proximal sight 106 when viewed through that sight. Although any color will do, a bright color such as an incandescent green provides better contrast. The sighting element 105 is commercially available, for example, from HIVIZ Shooting Systems of Fort Collins, Colo. (www.hivizsights.com), which currently sells the sighting element 105 under the name "LitePipes."

In one embodiment, the aiming device 100 is attached to an existing scanner to add aiming capability in accordance with the teaching of the present invention. Prior to use of the scanner, the aiming device 100 is attached, usually permanently, by attaching the lower surface 103 to a surface of the scanner. Once mounted on a scanner, the aiming device can be calibrated where the ambient light is sufficiently dim that the scanning beam will be visible. Because the scanning beam travels across a large width, side-to-side alignment and calibration of the aiming device are less important than the vertical alignment and calibration. Therefore, in one embodiment side-to-side alignment and calibration elements are not required, which reduces the cost of an aiming device according to the teachings of the present invention. To vertically calibrate the aiming device 100, once mounted on the scanner, the scanner is positioned so that the scanning beam traverses approximately through the middle of a bar code. The sighting element 105 is then viewed though the proximal sight 106, and the height of the proximal sight 106 is adjusted until the sighting element 105 appears to be at the bottom of the V-shaped notch 108.

Figure 2:
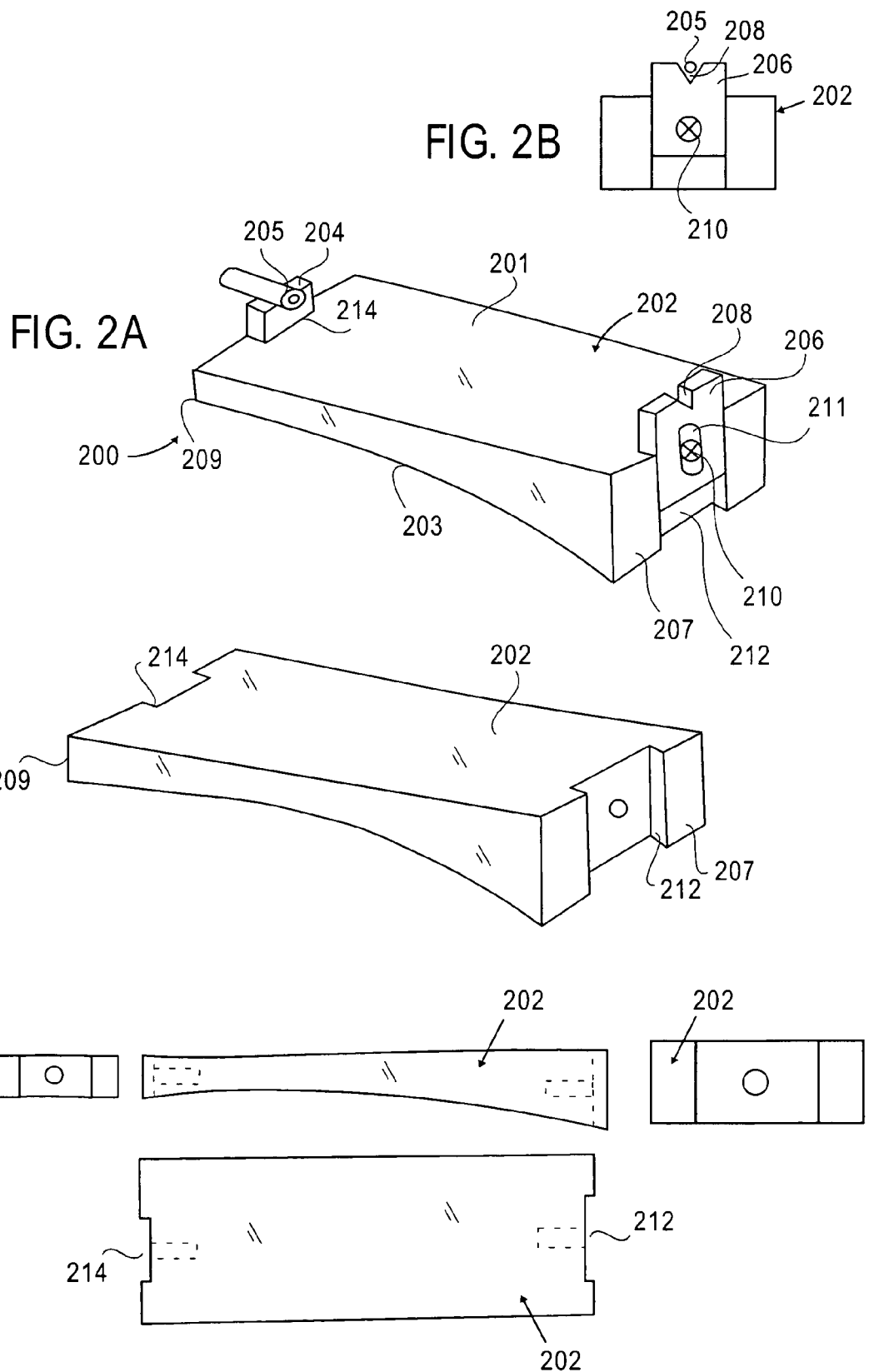
FIG. 2A is a perspective drawing of another embodiment of the invention.
FIG. 2B is a rear elevation drawing of the embodiment of the invention shown in FIG. 2A.

During operation of the aiming device 100, the user points the sighting element 105 at a bar code and adjusts the position of the scanner so that the sighting element appears to rest at the bottom of the V-shaped notch 108 (see FIG. 2B). When the sighting element appears to rest the bottom of the V-shape notch 108, the scanning beam from the scanner should traverse the bar code. In some cases, additional calibration may be necessary for proper aiming, for example to adjust for the way a particular user holds the scanner in their hand.

FIGS. 2A–2B illustrate an aiming device 200 that is an alternative embodiment of the invention. The aiming device 200 comprises a base 202 having a top surface 201, a bottom surface 203, a proximal end 207 and a distal end 209. A proximal sight 206 is attached to the proximal end 207, while a distal sight 204 is attached to the distal end 209 such that it substantially aligns with the proximal sight 206. The aiming device 200 is calibrated the same way as described above in connection with the aiming device 100, and operates the same way as well.

The base 202 is shaped so that the top surface is substantially flat, which the bottom surface is shaped to conform to the surface of the hand-held scanner to which the aiming device 200 will be attached. The proximal end 207 includes a slot 212 to receive the proximal sight 206, and the distal end 209 includes a slot 214 to receive the distal sight. Although in the embodiment shown the base tapers between the proximal end and the distal end, in other embodiments there can be more taper, less taper, or no taper at all. The width of the base will usually be less than or equal to the width of the scanner to which it will be attached. The base 202 can be made of any suitable material. In one embodiment, the base 202 is machined from a solid block of a metal such as aluminum, while in other embodiments the base can be molded plastic, or can be machined from a solid block of a plastic or polymer.

The proximal sight 206 is a simplified version of the proximal sight 106 and comprises a tab having a V-shaped notch 208, and a slot 211 therein. The proximal sight 206 is engaged in the slot 212 and is slidably attached to the proximal end 207 of the base by inserting a fastener such as a screw 210 into the slot 211. The proximal sight is positioned on the proximal end 207 so that it projects above the top surface 201 of the base. The distance by which the proximal sight 206 projects above the top surface 201, or more specifically the distance by which the bottom of the V-shaped notch projects above the top surface, can be adjusted by loosening the screw 210, moving the sight to the desired position, and tightening the screw. The proximal sight 206 can be made of any material that is compatible with the material used for the base 202; this may or may not be the same material as the base 202.

The distal sight 204 comprises a tab having therein a sighting element 205. The distal sight is engaged in the slot 214, is fixed to the distal end 209 and is substantially laterally aligned with the proximal sight 206; both proximal and distal sights may, for example, be positioned along a centerline of the base 202. The distal sight can be attached to the distal end of the base 202 by any means, such as fasteners, adhesives, etc. The sighting element 205 is substantially similar to the sighting element 105 described above in connection with the apparatus 100.

Figure 3:
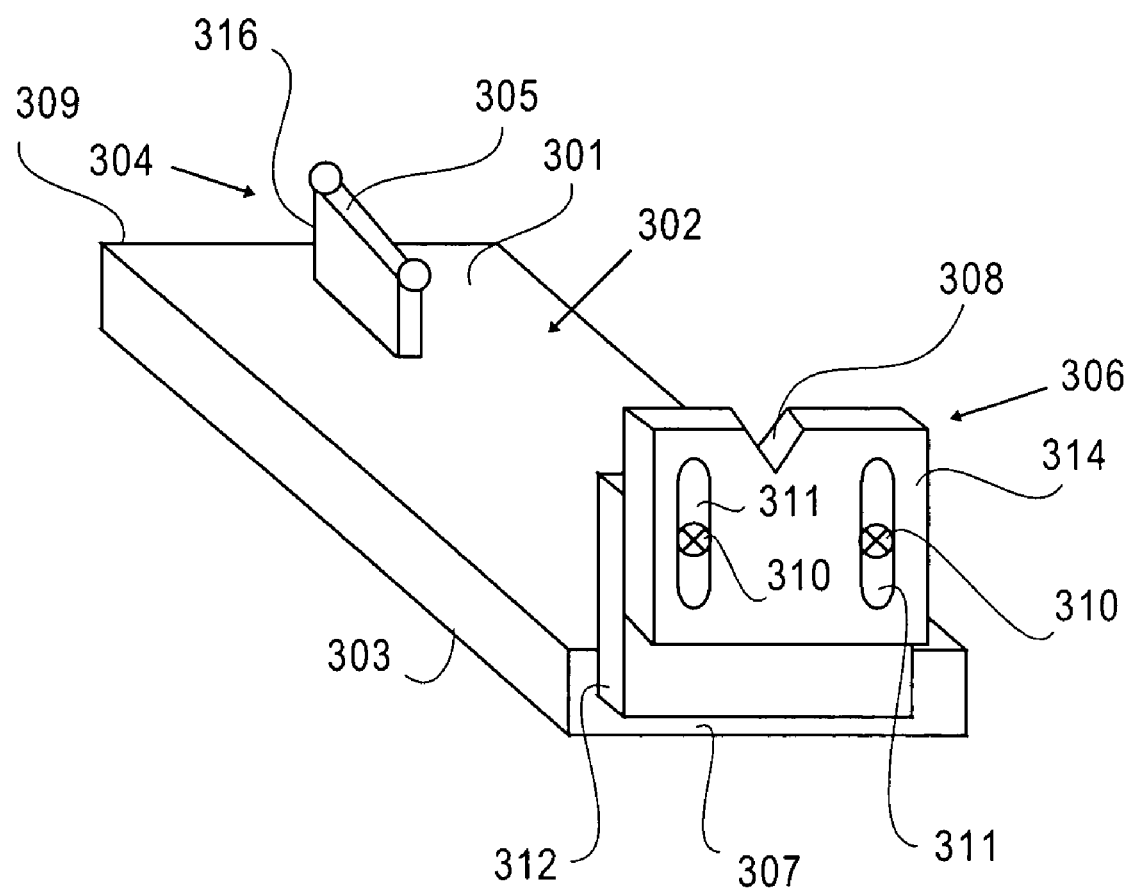
FIG. 3 is a perspective drawing of another embodiment of the invention.

FIG. 3 illustrates an aiming device 300 that is an alternative embodiment of the invention. The aiming device 300 comprises a base 302 having a top surface 301, a bottom surface 303, a proximal end 307 and a distal end 309. A proximal sight 306 is attached to the proximal end 307, while a distal sight 304 is attached to the distal end 309 such that it substantially aligns with the proximal sight 306. The aiming device 300 is calibrated the same way as described above in connection with the aiming devices 100 and 200, and operates the same way as well.

The base 302 is substantially similar to the based 102 and 202 described above, and shaped so that the top surface is substantially flat. The bottom surface is shaped to conform to the surface of the scanner to which the aiming device 300 will be attached.

The proximal sight 306 comprises a tab 314 having a V-shaped notch 308, and two slots 311 therein. The tab 314 is slidably attached to a flange 312 projecting from the proximal end 307, and is connected to the flange by inserting fasteners such as screws 310 into the slots 311. The distance by which the proximal sight 306 projects above the top surface 301, or more specifically the distance by which the bottom of the V-shaped notch 308 projects above the top surface, can be adjusted by loosening the screws 310, moving the sight to the desired position, and tightening the screws. The proximal sight 306 can be made of any material that is compatible with the material used for the base 302; this may or may not be the same material as the base 302.

The distal sight 304 comprises a mount 316 having therein a sighting element 305. The mount 316 is fixed to top surface 301 near the distal end 309 and is substantially laterally aligned with the proximal sight 306; both proximal and distal sights may, for example, be positioned along a centerline of the base 302. The mount 316 can be attached to the base 302 by any means, such as fasteners, adhesives, etc. The sighting element 305 is substantially similar to the sighting elements 105 and 205 described above.

Figure 4:
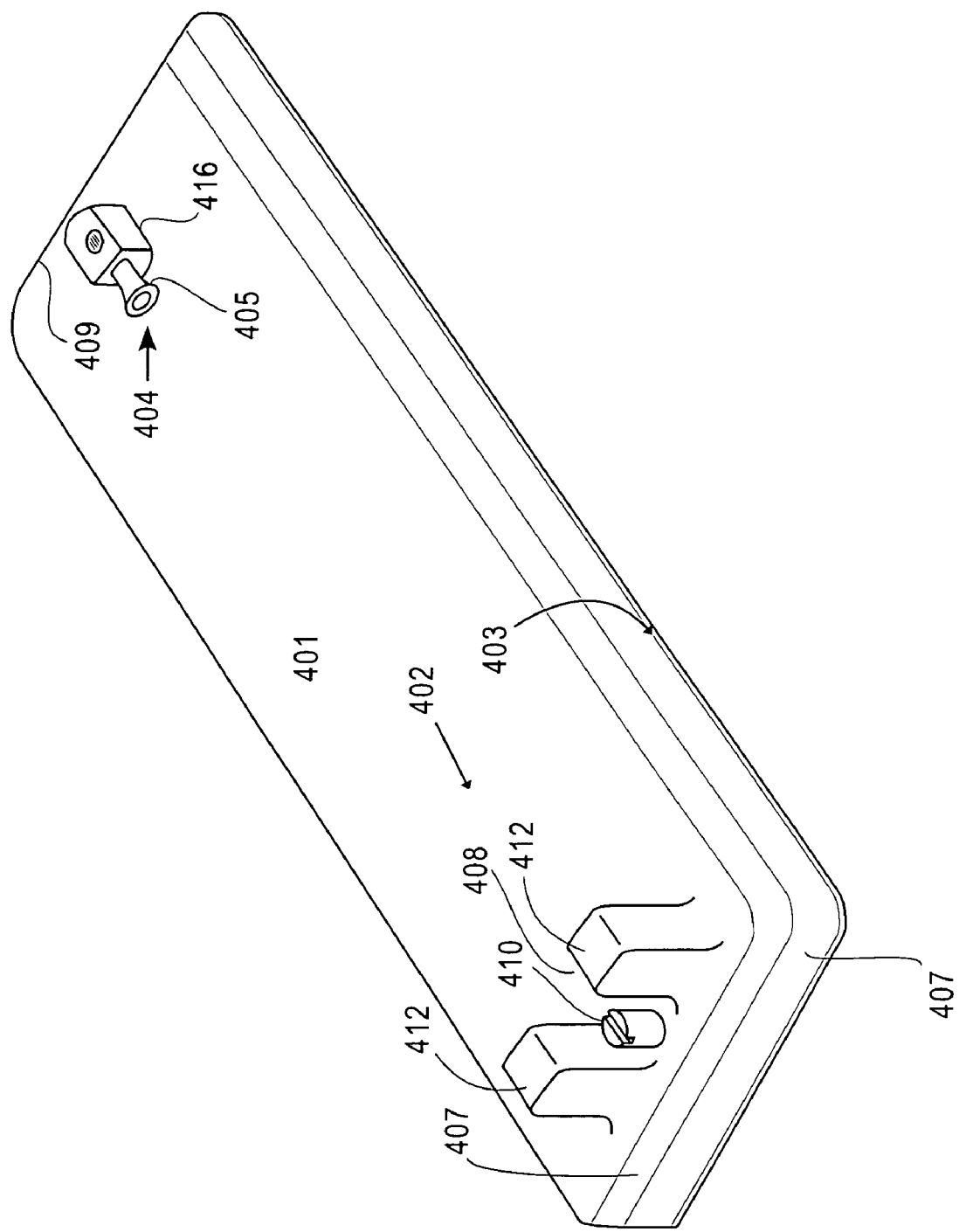
FIG. 4 is a shaded perspective drawing of another embodiment of the invention.

FIG. 4 illustrates an aiming device 400 that is an alternative embodiment of the invention. The aiming device 400 comprises a base 402 having a top surface 401, a bottom surface 403, a proximal end 407 and a distal end 409. A proximal sight 406 is attached near the proximal end 407, while a distal sight 404 is attached near the distal end 409 such that it substantially aligns with the proximal sight 406.

The base 402 is shaped so that the top surface is substantially flat, and the bottom surface is shaped to conform to the surface of the hand-held scanner to which the aiming device 400 will be attached. Although in the embodiment shown the base tapers between the proximal end and the distal end, in other embodiments there can be more taper, less taper, or no taper at all. The width of the base will usually be less than or equal to the width of the scanner to which it will be attached. The base 402 can be made of any suitable material. In one embodiment, the base 402 is machined from a solid block of a metal such a aluminum, while in other embodiments the base can be molded plastic, or can be machined from a solid block of a plastic or polymer.

The proximal sight 406 comprises a pair of uprights 412 integrally formed in the base and spaced apart to form a notch 408. A set screw 410 is positioned between the pair of uprights 412 and forms the bottom of the notch 408. The distance by which the bottom of the notch 408 projects above the top surface 401 can be adjusted—and the device 400 thereby calibrated—by loosening or tightening the set screw 410. The proximal sight 406 can be made of any material that is compatible with the material used for the base 402; this may or may not be the same material as the base 402.

The distal sight 404 comprises a mount 416 having therein a sighting element 405. The mount 416 is fixed to top surface 401 near the distal end 409 and is substantially laterally aligned with the proximal sight 406; both proximal and distal sights may, for example, be positioned along a centerline of the base 402. The mount 416 can be attached to the base 402 by any means, such as fasteners, adhesives, etc. The sighting element 505 is substantially similar to the sighting element 105 described above. The sighting element 405 is commercially available, for example, from HIVIZ Shooting Systems of Fort Collins, Colo. (www.hivizsights.com), which currently sells the sighting element 405 under the name "LitePipes." The entire distal sight 404 (i.e., the mount 416 plus the sighting element 405) is commercially available from the same supplier under the name "Spark II."

Figure 5:
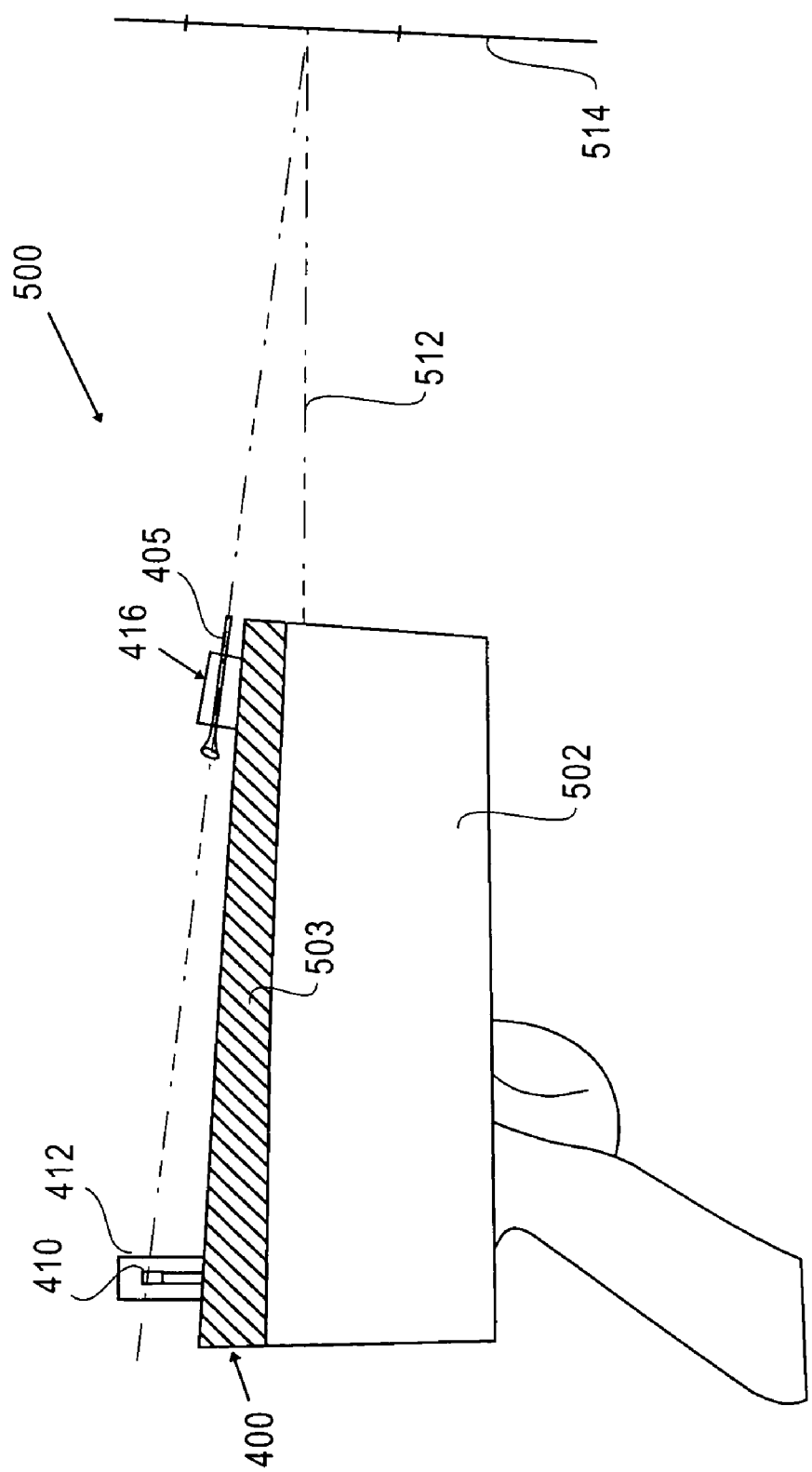
FIG. 5 is a side elevation drawing of an embodiment of a system that is an embodiment of the invention.

FIG. 5 illustrates an embodiment of a system 500 including an aiming device such as previously-described embodiments 100, 200, 300 and 400. The system 500 includes an aiming device such as the aiming device 400 mounted to a top surface 503 of a hand-held scanner 502. In operation, the sighting element is pointed at a bar code 514 and the sighting element is aligned between the uprights 412 such that it appears at the bottom of the notch 408 between the uprights 412 (in other words, it appear to be at the top of the set screw 410). The scanning beam 512 emitted by the scanner should then traverse the bar code when the trigger of the scanner 502 is depressed.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
  a base having a top, a bottom, a proximal side and a distal side, the bottom being attachable to a scanner;
  an adjustable proximal sight on or near the proximal side, the proximal sight including a sighting notch therein and comprising a pair of upright members defining the sighting notch, the bottom of the sighting notch being defined by the top of a set screw positioned between the upright members; and
  a distal sight on or near the distal side, the distal sight being substantially aligned with the proximal sight and including:
    a mount attached to the base, and
    a tubular sighting element attached to the mount.

2. The apparatus of claim 1 wherein the base is made of metal or plastic.

3. The apparatus of claim 1 wherein the bottom of the base is contoured to substantially match the shape of a surface of the scanner to which the base is attachable.

4. The apparatus of claim 1 wherein the set screw can be tightened or loosened such that a location of the bottom of the sighting notch can be changed.

5. The apparatus of claim 1 wherein the tubular sighting element comprises a substantially cylindrical tube.

6. The apparatus of claim 1 wherein the tubular sighting element comprises a substantially cylindrical tube whose end closest to the proximal sight is flared.

7. The apparatus of claim 1 wherein the tubular sighting element is made of an injection molded optical-quality resin.

8. The apparatus of claim 7 wherein the tubular sighting element is colored.

9. The apparatus of claim 8 wherein the color is incandescent green or orange.

10. An apparatus comprising:
  a base having a top, a bottom, a proximal side and a distal side, the bottom being contoured to substantially match the shape of a surface of the scanner to which the base is attachable;
  an adjustable proximal sight on or near the proximal side of the base, the proximal sight including a sighting notch therein and comprising a pair of upright members defining the sighting notch, the bottom of the sighting notch being defined by the top of a set screw positioned between the upright members; and
  a distal sight on or near the distal side of the base, the distal sight being substantially aligned with the proximal sight and including:
    a mount attached to the base, and
    a tubular sighting element attached to the mount, wherein the tubular sighting element comprises a substantially cylindrical tube.

11. The apparatus of claim 10 wherein the adjustable proximal sight comprises a tab slidably attached to the base, the tab including therein a substantially V-shaped sighting notch.

12. The apparatus of claim 10 wherein the set screw can be tightened or loosened such that a location of the bottom of the sighting notch can be changed.

13. The apparatus of claim 10 wherein the tubular sighting element comprises a substantially cylindrical tube whose end closest to the proximal sight is flared.

14. The apparatus of claim 10 wherein the tubular sighting element is colored.

15. A system comprising:
a scanner;
a base having a top, a bottom, a proximal side and a distal side, the bottom being attached to the scanner;
an adjustable proximal sight on or near the proximal side of the base, the proximal sight including a sighting notch therein and comprising a pair of upright members defining the sighting notch, the bottom of the sighting notch being defined by the top of a set screw positioned between the upright members; and
a distal sight on or near the distal side of the base, the distal sight being substantially aligned with the proximal sight and including a mount attached to the base and a tubular sighting element attached to the mount.

16. The apparatus of claim 15 wherein the bottom of the base is contoured to substantially match the shape of a surface of the scanner to which the base is attached.

17. The apparatus of claim 15 wherein the set screw can be tightened or loosened such that a location of the bottom of the sighting notch can be changed.

18. The apparatus of claim 15 wherein the tubular sighting element comprises a substantially cylindrical tube.

19. The apparatus of claim 15 wherein the tubular sighting element comprises a substantially cylindrical tube whose end closest to the proximal sight is flared.

20. The apparatus of claim 15 wherein the tubular sighting element is colored.

21. The apparatus of claim 20 wherein the color is incandescent green or orange.

22. A process comprising:
attaching an aiming apparatus to a scanner, the aiming apparatus comprising:
a base having a top, a bottom, a proximal side and a distal side, the bottom being attachable to the scanner,
an adjustable proximal sight on or near the proximal side of the base, the proximal sight including a sighting notch therein and comprising a pair of upright members defining the sighting notch, the bottom of the sighting notch being defined by the top of a set screw positioned between the upright members, and
a distal sight on or near the distal side of the base, the distal sight the distal sight being substantially aligned with the proximal sight and including a mount attached to the base and a tubular sighting element attached to the mount;
aiming the scanner at an optical symbol such that a trajectory of the scanner's laser crosses from the leading edge to the trailing edge of the symbol and such that the tubular sighting element appears to substantially coincide with the symbol; and
adjusting the location of the bottom of the sighting notch until the tubular element appears to substantially coincide with the symbol and appears to a user to coincide with the bottom of the sighting notch.

23. The process of claim 22 wherein adjusting the location of the bottom of the sighting notch comprises tightening or loosening the set screw.

24. The process of claim 22 wherein the tubular sighting element comprises a substantially cylindrical tube.

25. The process of claim 22 wherein the tubular sighting element comprises a substantially cylindrical tube whose end closest to the proximal sight is flared.

26. A process comprising:
providing a scanner including an aiming apparatus attached thereto, the aiming apparatus comprising:
a base having a top, a bottom, a proximal side and a distal side, the bottom being attachable to the scanner,
an adjustable proximal sight on or near the proximal side of the base, the proximal sight including a sighting notch therein and comprising a pair of upright members defining the sighting notch, the bottom of the sighting notch being defined by the top of a set screw positioned between the upright members, and
a distal sight on or near the distal side of the base, the distal sight the distal sight being substantially aligned with the proximal sight and including a mount attached to the base and a tubular sighting element attached to the mount;
aiming the scanner at an optical symbol such that the tubular sighting element appears to a user to substantially coincide with the symbol; and
adjusting the elevation angle of the scanner until the tubular sighting element appears to substantially coincide with the symbol and also appears to coincide with the bottom of the sighting notch.

27. The process of claim 26 wherein the bottom of the base is contoured to substantially match the shape of a surface of the scanner to which the base is attached.

28. The process of claim 26 wherein the tubular sighting element comprises a substantially cylindrical tube.

29. The process of claim 26 wherein the tubular sighting element comprises a substantially cylindrical tube whose end closest to the proximal sight is flared.

30. The process of claim 26 wherein the tubular sighting element is colored.

31. The process of claim 26 wherein the color is incandescent green or orange.

* * * * *